United States Patent
Matsumoto

(10) Patent No.: US 10,298,455 B2
(45) Date of Patent: May 21, 2019

(54) DATA PROCESSING SYSTEM, DATA PROCESSING CONTROL APPARATUS, AND DATA PROCESSING CONTROL METHOD

(71) Applicant: Yoshiki Matsumoto, Kanagawa (JP)

(72) Inventor: Yoshiki Matsumoto, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 261 days.

(21) Appl. No.: 15/264,096

(22) Filed: Sep. 13, 2016

(65) Prior Publication Data
US 2017/0078148 A1    Mar. 16, 2017

(30) Foreign Application Priority Data

Sep. 14, 2015  (JP) ................................. 2015-181087
Sep. 6, 2016   (JP) ................................. 2016-173871

(51) Int. Cl.
*H04L 12/24*    (2006.01)
*H04L 29/08*    (2006.01)
*H04L 29/06*    (2006.01)

(52) U.S. Cl.
CPC ...... *H04L 41/0823* (2013.01); *H04L 41/0813* (2013.01); *H04L 67/16* (2013.01); *H04L 67/34* (2013.01); *H04L 67/42* (2013.01)

(58) Field of Classification Search
CPC ..... H04L 41/0823; H04L 67/16; H04L 67/34; H04L 67/42
See application file for complete search history.

(56) References Cited

U.S. PATENT DOCUMENTS 9,548,740 B1*   1/2017  Chen ................ H03K 19/17748
2003/0067488 A1*  4/2003  Rudd ..................... G06F 3/0481
                                                        715/765

(Continued)

FOREIGN PATENT DOCUMENTS

JP    2013-062566       4/2013
JP    2013-171435       9/2013
JP    2013171435 A  *   9/2013

Primary Examiner — Michael A Keller
Assistant Examiner — Jsing Forng Lin
(74) Attorney, Agent, or Firm — Oblon, McClelland, Maier & Neustadt, L.L.P.

(57) ABSTRACT

A data processing system includes a data processing device to perform various types of processing using a reconfigurable hardware processor; and a server connected to the data processing device via a network. The server includes as memory to store user information of one or more users who have operated the data processing device to perform various types of processing. The user information indicates usage trends for processing performed by each user with the data processing device. The server also includes a receiver to receive a request for hardware information from the data processing device. The request includes user information obtained at the data processing device. The server further includes a processor to compare between the user information stored in the memory and the user information included in the request for hardware information, and optimize hardware information used for previously configuring the reconfigurable hardware processor to generate optimized hardware information based on a comparison result. The data processing device includes a processor to obtain the optimized hardware information from the server and reconfigure the reconfigurable hardware processor based on the optimized hardware information.

12 Claims, 11 Drawing Sheets

(56) References Cited

U.S. PATENT DOCUMENTS

| | | | |
|---|---|---|---|
| 2007/0063998 A1* | 3/2007 | Mahesh | G06F 3/0482 345/419 |
| 2010/0332795 A1* | 12/2010 | Furukawa | G06F 9/3001 712/29 |
| 2016/0323143 A1* | 11/2016 | Kim | G06F 9/441 |
| 2017/0078896 A1* | 3/2017 | Kephart, Jr. | H04L 41/0823 |
| 2017/0139599 A1* | 5/2017 | Kozlovsky | G06F 3/0604 |

* cited by examiner

FIG. 8

| USER ID | GENDER | AGE | LENGTH OF SERVICE | POSITION | DEPARTMENT | PROCESS(ES) THAT IS(ARE) FREQUENTLY USED | HARDWARE INFORMATION ID NUMBER |
|---|---|---|---|---|---|---|---|
| USER A | MALE | 36 | 10 | GENERAL EMPLOYEE | DESIGN | PROCESS A | HARDWARE INFORMATION 1 |
| USER B | MALE | 24 | 1 | GENERAL EMPLOYEE | DESIGN | PROCESS A AND PROCESS B | HARDWARE INFORMATION 2 |
| USER C | FEMALE | 42 | 15 | DEPARTMENT MANAGER | SALES | PROCESS C | HARDWARE INFORMATION 3 |
| USER D | MALE | 58 | 24 | SECTION MANAGER | SALES | PROCESS A AND PROCESS C | HARDWARE INFORMATION 4 |
| USER E | FEMALE | 32 | 3 | GENERAL EMPLOYEE | DESIGN | PROCESS B | HARDWARE INFORMATION 5 |

FIG. 9

| HARDWARE INFORMATION ID NUMBER | CIRCUIT CONFIGURATION INFORMATION |
|---|---|
| HARDWARE INFORMATION 1 | CONFIGURATION DATA 1 |
| HARDWARE INFORMATION 2 | CONFIGURATION DATA 2 |
| HARDWARE INFORMATION 3 | CONFIGURATION DATA 3 |
| HARDWARE INFORMATION 4 | CONFIGURATION DATA 4 |
| HARDWARE INFORMATION 5 | CONFIGURATION DATA 5 |
| HARDWARE INFORMATION 6 | CONFIGURATION DATA 6 |

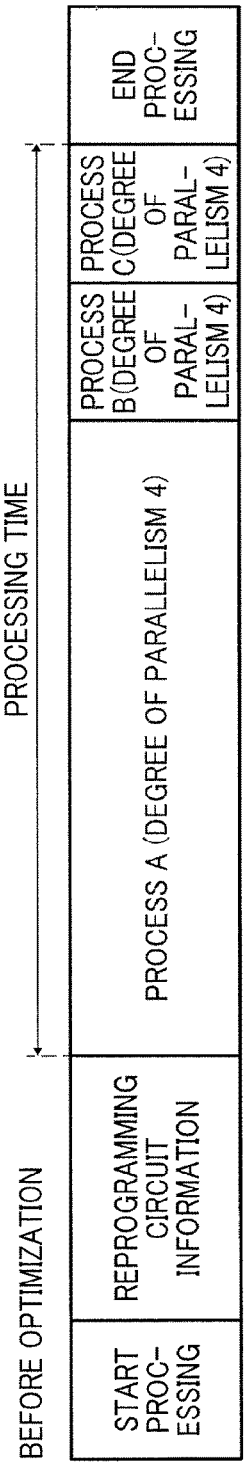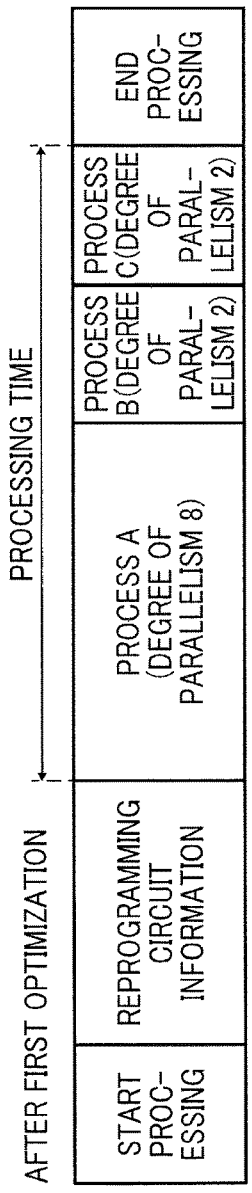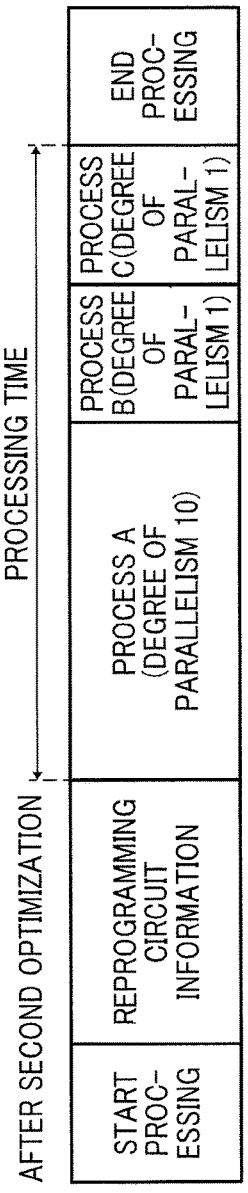

FIG. 11

| HARDWARE INFORMATION ID NUMBER | PROCESS | DEGREE OF PARALLELISM | PROCESSING TIME [ms] |
|---|---|---|---|
| HARDWARE INFORMATION 1 | A | 8 | 1000 |
| | B | 2 | 200 |
| | C | 2 | 200 |
| HARDWARE INFORMATION 2 | A | 5 | 1600 |
| | B | 5 | 80 |
| | C | 2 | 80 |
| HARDWARE INFORMATION 3 | A | 2 | 4000 |
| | B | 2 | 200 |
| | C | 8 | 50 |
| HARDWARE INFORMATION 4 | A | 5 | 1600 |
| | B | 2 | 200 |
| | C | 5 | 80 |
| HARDWARE INFORMATION 5 | A | 2 | 4000 |
| | B | 8 | 50 |
| | C | 2 | 200 |

DATA PROCESSING SYSTEM, DATA PROCESSING CONTROL APPARATUS, AND DATA PROCESSING CONTROL METHOD

CROSS-REFERENCE TO RELATED APPLICATION

This patent application is based on and claims priority pursuant to 35 U.S.C. § 119(a) to Japanese Patent Application No. 2015-181087, filed on Sep. 14, 2015, and Japanese Patent Application No. 2016-173871, filed on Sep. 6, 2016, in the Japan Patent Office, the entire disclosure of which is hereby incorporated by reference herein.

BACKGROUND

Technical Field

Embodiments of the present invention relate to a data processing system, a data processing control apparatus, and a data processing control method.

Related Art

In the recent data processing systems that perform real time image processing, there is an increasing demand for systems capable of processing a large number of calculations in a short period of time. Such systems usually use an accelerator utilizing an application specific integrated circuit (ASIC) to distribute software processing. The ASIC, however, is customized for a particular processing and has poor versatility, such that the system may not operate appropriately when a new function is added or process contents are modified.

In views of this, an accelerator utilizing a field programmable gate array (FPGA) that is reprogrammable hardware is used for a data processing system performing various types or processing when a new function is added or process contents are modified.

SUMMARY

A data processing system, according to one embodiment, includes a data processing device to perform various types of processing using a reconfigurable hardware processor, and a server connected to the data processing device via a network. The server includes a memory to store user information of one or more users who have operated the data processing device to perform various types of processing. The user information indicates usage trends for processing performed by each user with the data processing device. The server also includes at receiver to receive a request for hardware information from the data processing device. The request includes user information obtained at the data processing device. The server further includes a processor to compare between the user information stored in the memory and the user information included in the request for hardware information, and optimize hardware information used for previously configuring the reconfigurable hardware processor to generate optimized hardware information based on as comparison result. The data processing device includes a processor to obtain the optimized hardware information from the server and reconfigure the reconfigurable hardware processor based on the optimized hardware information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a table illustrating one example of user information in the data processing device illustrated in FIG. 1;

FIG. 9 is a table illustrating one example of hardware information managed by the data processing device illustrated in FIG. 1;

FIGS. 10A to 10C are diagrams illustrating examples of processing times for explaining one example of decision criteria for determining whether the hardware information is optimal in the data processing device illustrated in FIG. 1;

FIG. 10A is a diagram illustrating one example of a processing time before optimization;

FIG. 10B is a diagram illustrating one example of a processing time after first optimization;

FIG. 10C is as diagram illustrating one example of a processing time after second optimization;

FIG. 11 is a table illustrating one example of data processing results of the data processing device 20 in FIG. 1;

DETAILED DESCRIPTION

Figure 1:
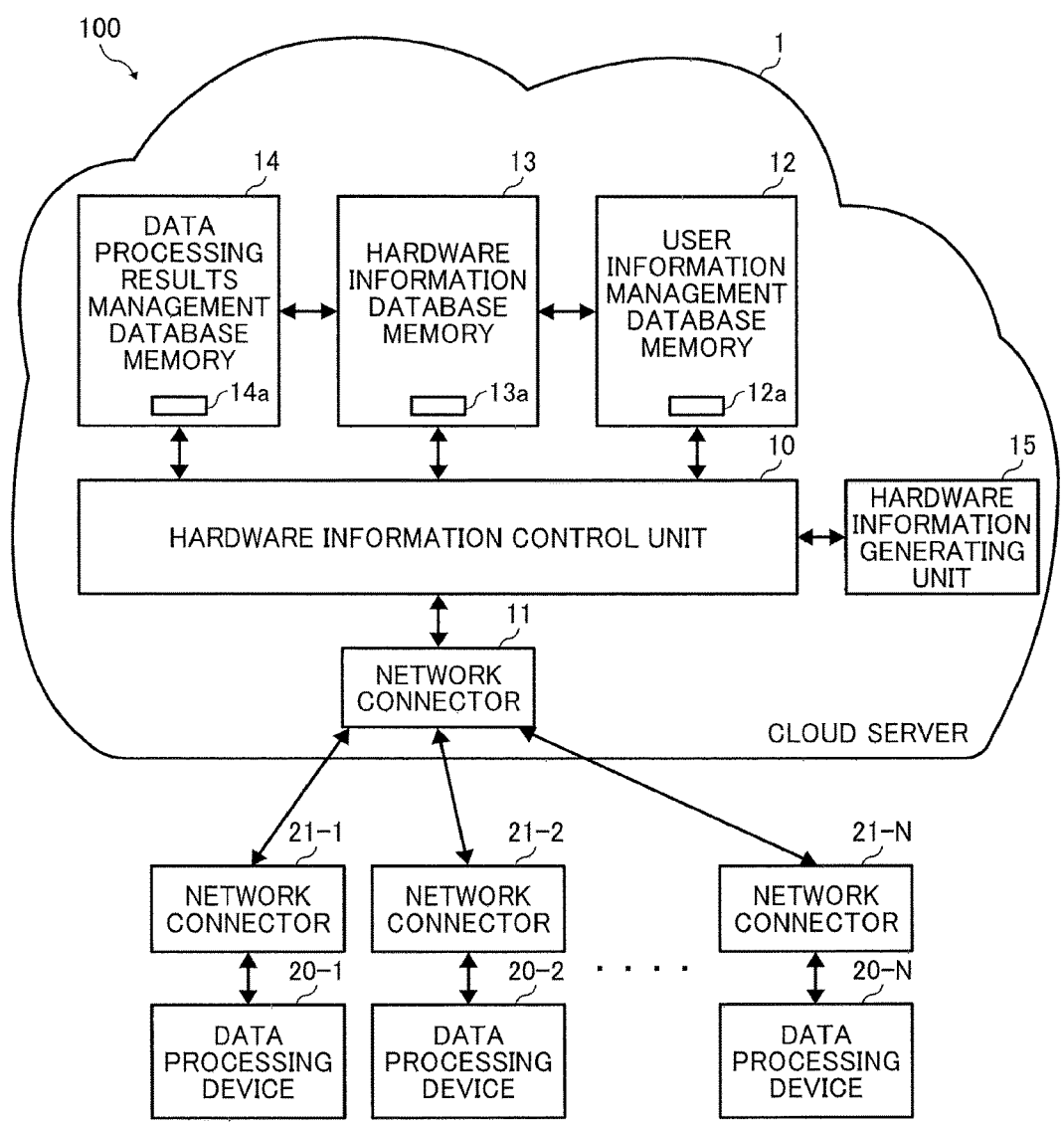
FIG. 1 is a block diagram illustrating a configuration of a data processing system that collects information on application usage trends for each user and automatically generates hardware of a data processing device, according to an embodiment of the present invention.

The terminology used herein is for the purpose of describing particular embodiments only and is not intended, to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing example embodiments illustrated in the drawings, specific terminology is employed for the sake of clarity. However, the present disclosure is not intended to be limited to the specific terminology so selected and it is to be understood that each specific element includes all technical equivalents that operate in a similar manner.

A description is now given of exemplary embodiments of the present invention. The same reference numerals will be assigned to the same or like elements throughout the drawings.

FIG. 1 is a block diagram illustrating a configuration of a data processing system 100 according to an embodiment of the present invention. The data processing system 100 includes one or more data processing devices 20, and a cloud server 1, which are connected through a network, such as the Internet. The data processing system 100 collects information on application usage trends for each user and automatically generates hardware information to be used for reprogramming the hardware processor of the data processing device 20. The application usage trends (usage states or tendencies) for each user, here, means, for example, a "process that is frequently used for performing a function (processing) with the data processing device 20" or "processing that is frequently performed with the data processing, device 20" more than a predetermined number of times by each user operating the data processing device 20. In this example, the data processing device 20 may be an image processing device such as a multifunctional printer.

Examples of such function or processing that can be performed by the data processing device 20 in response to a user request includes, but not limited to, various types of image processing performed with various image processing applications to achieve various image processing functions, such as an OCR function and invisible information embedding function. When the OCR function is performed, examples of such processes for performing the function includes color converting, character area segmenting, and feature extraction. In the following, the processing and the function may be used interchangeably. Further, the number of processes that is frequently used may be more than one, as more than one processes may be analyzed as the frequently-used processes that have been performed more than a predetermined number of times. Further, the predetermined number of times may be previously set by, for example, an administrator of the system.

The data processing device 20 according to the embodiment includes a reconfigurable hardware processor 32, which is implemented by a field programmable gate array (FPGA) that is hardware reprogrammable to perform specific processing. The FPGA in this embodiment thus operates as a hardware accelerator that is used to perform processing concurrently with the CPU to increase a processing speed. For example, when there is a process that is frequently used by the user, processing contents (circuit configuration) of the FPGA are reprogrammed to reflect such frequently-used process so that a time for such frequently-used process may be shortened. According to the embodiment of the present invention, to reprogram a circuit configuration of the FPGA for the data processing device 20 operated by a user, history information of other users other than the operating user is used. The use of the history information of the other users can shorten a time period required for optimizing the FPGA (hardware accelerator) in as manner that a processing time of a function that the user frequently uses becomes shortest. The cloud server 1 collects and accumulates the information on the application usage trends for each user. The cloud server 1 generates circuit information of the FPGA to be used by the data processing device 20 in advance by adjusting degree of parallelism of circuits of the FPGA according to the usage trends of each user that has operated the data processing device 20. The cloud server 1 stores a plurality of patterns of circuit information of the FPGA corresponding to each user assumed to use the data processing device 20. The data processing device 20 downloads the circuit information of the FPGA from the cloud server 1, which is to be used for automatically optimizing circuit implementation of the FPGA based on a user using the data processing device 20 in a manner that the processing time becomes shorter. The degree of parallelism, here, means the number of circuits that can perform a process in parallel.

FIG. 1 illustrates one example of a network configuration between the cloud server 1 and each data processing device 20 in the data processing system 100. As described above, the cloud server 1 collects the information on the application usage trends for each user and automatically generates the circuit information of the FPGA hardware of the data processing device 20. The cloud server 1 may be implemented by one or more computers capable of communicating, each computer including a processor such as a CPU, a memory, and a network interface circuit (NIC). The cloud server 1 illustrated in FIG. 1 includes a hardware information control unit 10, a network connector 11, database memories 12, 13, and 14, and a hardware information generating unit 15. The user information management database memory 12 stores a user information management database 12a. The hardware information database memory 13 stores a hardware information database 13a. The data processing results management database memory 14 stores a data processing results management database 14a. The hardware information control unit 10 and the hardware information generating unit 15 are each implemented by instructions generated by, for example, the processor such as the CPU. While the memories 12, 13, and 14 are described as separate in FIG. 1, one or more memories may be used as the memories 12, 13, and 14.

The network connector 11, which may be implemented by the NIC, connects between the hardware information control unit 10 and the network connectors 21 (21-1 to 21-N) via the network. The network connectors 21-1 to 21-N are connected to the data processing devices 20-1 to 20-N, respectively. N is a positive integer of two or more. Here, the data processing devices 20-1 to 20-N may be collectively referred to as the data processing device 20 and the network connector 21-1 to 21-N may be collectively referred to as the network connector 21. The cloud server 1 manages hardware information of the FPGA of the data processing device 20 such that the hardware information is updated according to user information on the user using the data processing device 20.

The cloud server 1 respectively stores in the memories 14, 13, and 12, the data processing results management database 14a, the hardware information database 13a, and the user information management database 12a in association with one another. In response to a request for hardware information transmitted from the data processing device 20 to the cloud server 1, the hardware information generating unit 15 of the cloud server 1 compares user information in the user information management database 12*a* with user information included in the request transmitted from the data processing device 20. More specifically, the user information included in the request is obtained from a user information management unit 37 (illustrated in FIG. 4) of the data processing device 20, as the user information reflecting the current usage trend and the current user attributes. Based on the comparison, the hardware information generating unit 15 generates optimized hardware information. That is, the optimized hardware information is generated in a manner that the degree of parallelism of circuits is adjusted based on the results of comparison in user information between the one managed with the data processing device 20 (reflecting the current user information) and the one stored in the cloud server 1 (reflecting the previous user information), thus shortening the processing time for generating the hardware information for the user. As illustrated in FIG. 8, the user information, here, includes information regarding, attributes of a user such as a gender of the user, age of the user, length of service indicating duration of employment, position of the user, and department to which the user belongs. The user information also includes as process that is frequently used (more than a predetermined number of times) by the user with the data processing device 20 and a hardware information ID number. When a new usage trend is found in the user information accumulated in the user information management database 12*a*, the hardware information generating unit 15 performs operation as described below. The hardware information generating unit 15 adjusts the hardware information based on the new usage trend of the user information in a manner that degree of parallelism for a process that is frequently used is high (degree of parallelism for a process that is less frequently used is low) to generate the optimized hardware information, and then registers the generated information in the hardware information database 13*a* for later use.

Here, the user information management database 12*a* stores user information as illustrated in FIG. 8. The user information of the user information management database 12*a* corresponds to user information, which are collected from each of the data processing devices 20-1 to 20-N. The hardware information database 13*a* stores various types of configuration data to be programmed to the reconfigurable hardware processor 32 as hardware information. The configuration data is, for example, circuit configuration information that is optimized based on the processing usage trend, which includes circuit information for configuring the reconfigurable hardware processor 32. The configuration data of the hardware information may be generated for each of users by the hardware information generating unit 15. Alternatively, when a plurality of users frequently use the same processes, the configuration data common to the plurality of users may be generated by the hardware information generating unit 15. Additionally, the data processing results management database 14*a* includes, for example, association information associating a processing time for a predetermined processing that the data processing device 20 performs, with the hardware information.

Here, each of database memories 12, 13, and 14 in the cloud server 1 illustrated in FIG. 1 may each be implemented by any desired memory such as a hard disk drive and a solid state drive (SSD).

The hardware information of the FPGA in the data processing device 20 can be generated in various ways, for example, as described below.

Figure 2:
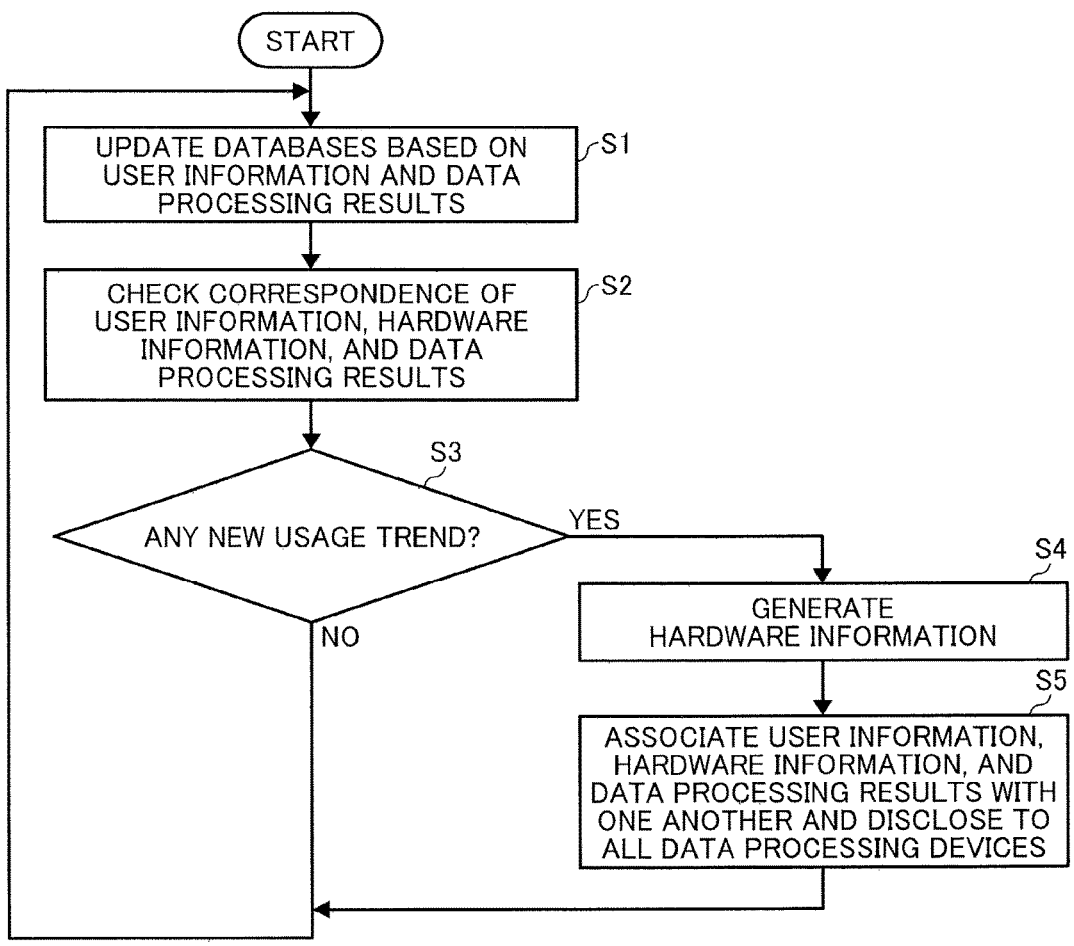
FIG. 2 is a flowchart illustrating a first generating process that is one example of a generating process for generating hardware information performed by a cloud server illustrated in FIG. 1, according to the embodiment of the present invention.

FIG. 2 is a flowchart illustrating a first generating process, which is one example of a generating process for generating the hardware information, performed by the cloud server 1 of FIG. 1. In this example, the hardware information that is previously generated based on the previously obtained user information is updated to reflect the current user information and the current data processing results, obtained from the data processing device 20. The operation of FIG. 2 may be performed, for example, in response to a user login to the data processing system 100.

In S1 of FIG. 2, the hardware information control unit 10 updates the user information management database 12*a* and the data processing results management database 14*a* respectively with the user information and data processing results that are obtained from the data processing device 20. Next, in S2, the hardware information control unit 10 checks correspondence among the updated user information, the hardware information, and the updated data processing results, which are stored in respective databases 12*a*, 13*a*, and 14*a*. At S3, the hardware information control unit 10 determines whether a new usage trend is found based on a check result of S2; if YES, the process proceeds to S4; if NO, the process returns to S1. The new usage trend is found when, for example, processes that is frequently used, as illustrated in FIG. 8, by the user login to the data processing device 20 is different from the information stored in the user information management database 12*a* in the cloud server 1. When, for example, the process that is frequently used by the user is common to a previous user, and hardware information optimized to the previous user has been already generated, the optimized hardware information can be used for the current user and thus the hardware information generating unit 15 does not need to generate new hardware information. On the other hand, when the process that is frequently used by the user has never been registered before and is newly added, the hardware information generating unit 15 generates new hardware information. In S4, the hardware information generating unit 15 adjusts the hardware information based on the user information in a manner that the degree of parallelism for the process that is frequently used is high (in contrast, for example, the degree of parallelism for the process that is less frequently used is low) and generates the optimized hardware information. In S5, the hardware information control unit 10 associates the generated hardware information with the user information and the data processing results one another, and stores each type of information to corresponding one of the databases, 12*a*, 13*a*, and 14*a*. The hardware information control unit 10 then discloses the information to all of the data processing devices 20. After that, the process returns to S1 to repeat the operation of FIG. 2.

As described above, the first generating process of FIG. 2 can automatically generate the optimized hardware information, which shortens the processing speed of the data processing device 20, based on the user information when the new usage trend is found in the collected user information and data processing results. While the above-described operation refers to both of the user information and the data processing results, only one of these information may be referred to determine whether to update the hardware information.

Figure 3:
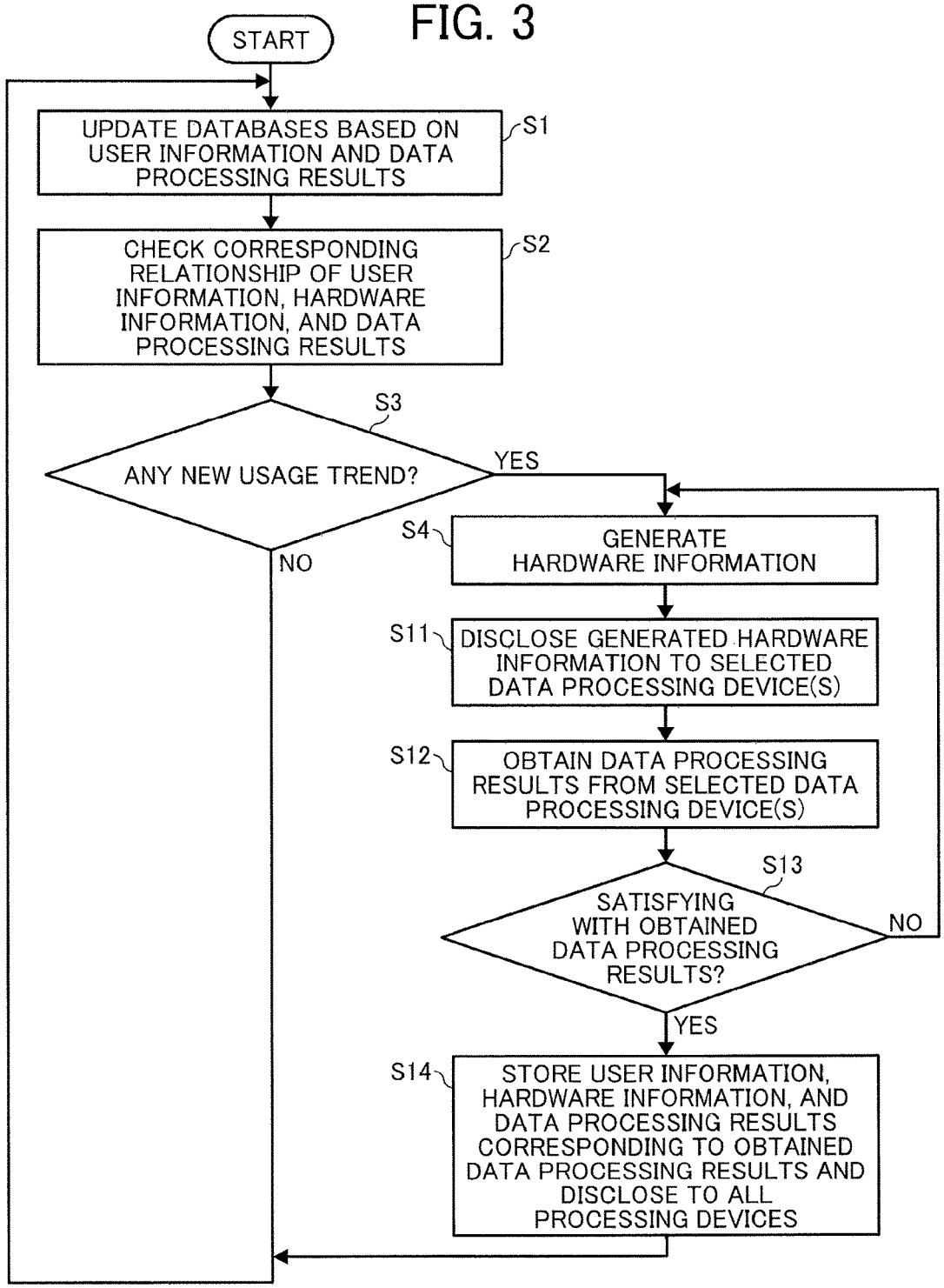
FIG. 3 is a flowchart illustrating a second generating process that is another example of the generating process for generating the hardware information performed by the cloud server illustrated in FIG. 1, according to the embodiment of the present invention.

FIG. 3 is a flowchart illustrating a second generating process, which is another example of the generating process for generating the hardware information, performed by the cloud server 1 of FIG. 1. The second generating process of FIG. 3 is different from the first generating process of FIG. 2 in having S11 to S14 instead of S5 of FIG. 2. The detailed differences are described below.

Referring, to FIG. 3, in S11, the hardware information control unit 10 discloses the above-mentioned generated hardware information to selected one or more of the data processing devices 20. The selected data processing devices 20 described above may be the data processing devices 20 each having the new usage trend, as determined at S3. In S12, the hardware information control unit 10 obtains the data processing results of the selected data processing devices 20 described above. S13 determines whether the data processing results satisfy the predetermined condition, for example, whether the processing time that is obtained from the data processing device 20 is equal to or less than a predetermined processing time. In S13, if YES, the process proceeds to S14; if NO, the process returns to S4 and starts again from S4. In S14, the hardware information control unit 10 stores the user information, the hardware information, and the data processing results, which correspond to the obtained data processing results, to the databases 12a, 13a, and 14a, respectively, in a manner that the above-mentioned various types of information are associated to one another.

At least the hardware information, which is updated, is then disclosed to all of the data processing devices 20, and the process returns to S1. In addition to the hardware information, the cloud server 1 may transmit other information such as the user information or the data processing results to the data processing device 20.

As described above, the second generating process of FIG. 3 can automatically generate the hardware information based on the user information when the new usage trend is found from the collected user information and the data processing results. As described with the second generating process, the newly-generated hardware information is disclosed to only the selected data processing devices 20 each having the new usage trend. The cloud server 1 obtains, from each selected data processing device 20, data processing results that are obtained using the FPGA reprogrammed to reflect the newly-generated hardware information. For example, the cloud server 1 determines whether an actual processing time is equal to or less than a predetermined time, to confirm that the newly-generated hardware information is applicable. The newly-generated information, which is confirmed, is then disclosed to all of the data processing devices 20 so that the quality of the hardware information generated automatically can be maintained and enhanced.

Figure 4:
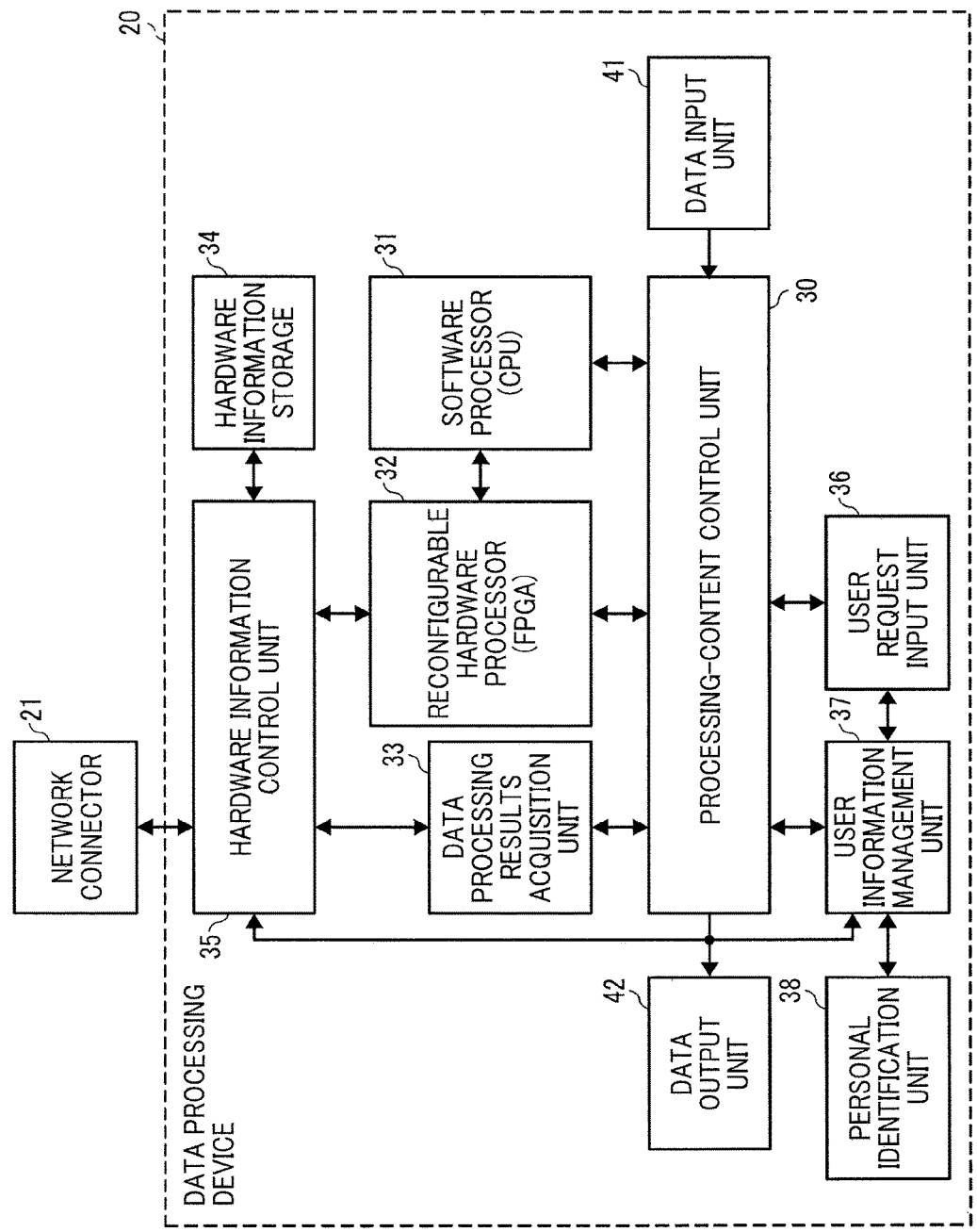
FIG. 4 is a block diagram illustrating a detailed configuration of the data processing device illustrated in FIG. 1 according to the embodiment of the present invention.

FIG. 4 is a block diagram illustrating a detailed configuration of the data processing device 20 of FIG. 1. Referring to FIG. 4, the data processing device 20 includes a processing-content control unit 30, a software processor 31, a reconfigurable hardware processor 32, a data processing results acquisition unit 33, a hardware information storage 34, and a hardware information control unit 35. The data processing device 20 further includes a data input unit 41, a data output unit 42, a user request input unit 36, the user information management unit 37, and a personal identification unit 38. The processing-content control unit 30, the hardware information, control unit 35, software processor 31, and the data processing results acquisition unit 33, may each be implemented by a CPU such as a digital computer. The reconfigurable hardware processor 32 is hardware that is reconfigurable, for example, a field-programmable gate array (FPGA). The hardware information control unit 35 is connected to the cloud server 1 (illustrated in FIG. 1) via the network connector 21. The hardware information storage 34 may be implemented by any desired memory. The user information management unit 37 may be implemented by a CPU and any desired memory. The user request input unit 36 may be implemented by a control panel, and the personal identification unit 38 may be implemented by, for example, IC card interface and a CPU. Additionally, the data input unit 41 and the data output unit 42 may be each implemented by any desired interface, such as a local area bus (LAB), universal serial bus (USB), or PCI Express.

The personal identification unit 38 acquires user ID using, for example, an IC card interlace and identifies a user who is logging in to the data processing device 20 to determine if a user logs in. The personal identification unit 38 then outputs the user information of the user logging in to the data processing device 20 to the hardware information control unit 35 and the user information management unit 37. The processing-content control unit 30, for example, uses the software processor 31 and the reconfigurable hardware processor 32 to perform predetermined image processing on data input from the data input unit 41 based on a user request input from the user request input unit 36. The processing-content control unit 30 then outputs the processed data to the data output unit 42. Here, the predetermined image processing includes, for example, optical character reader (OCR) processing and an invisible information embedding processing in which the invisible information including ID of the user perforating printing and an ID number of the data processing device 20 are printed on a media, such as a sheet of paper for the purpose of enhancing security. The software processor 31 stores software to be used for performing the predetermined image processing under control of processing-content control unit 30, for example, in cooperation with the reconfigurable hardware processor 32. The reconfigurable hardware processor 32 performs the predetermined image processing under control of the software stored in the software processor 31 and then outputs the processed data to the data output unit 42 via the processing-content control unit 30. The user information management unit 37 inputs and manages processes for performing a function requested with the user request input from the user request input unit 36. For example, the user information management unit 37 stores a process that is frequently used by the user, in association with user attributes of that user (See FIG. 8), and outputs the user information including information regarding the frequently-used process to the hardware information control unit 35. The data processing results acquisition unit 33 obtains the data processing results, including, for example a processing time for performing predetermined image processing as described below using the FPGA, and then outputs the obtained results to the hardware information control unit 35. The hardware information storage 34, such as a hard disk drive, stores the hardware information of the local data processing device 20, and outputs the stored hardware information to the hardware information control unit 35. The hardware information control unit 35 communicates with the cloud server 1 via the network connector 21. In addition, the hardware information control unit 35 also programs optimized hardware information to the reconfigurable hardware processor 32 based on a login user each time one of users logs in to the data processing device 20. At this time, the hardware information control unit 35 accesses the hardware information stored in the hardware information storage 34 to determine which hardware configuration should be set to the reconfigurable hardware processor 32 and updates the hardware information. Specifically, the hardware information control unit 35 performs an acquisition process for acquiring the hardware information, which is described below with reference to FIG. 6, and a reprogramming process for reprogramming with the hardware information, which is described in FIG. 7.

The data processing device 20 of FIG. 4 obtains the hardware information from the cloud server 1 via the network connector 21 connected to the hardware information control unit 35. The hardware information control unit 35 is also connected to the data processing results acquisition unit 33 and the user information management unit 37. With this configuration, the circuit information (hardware information) of the reconfigurable hardware processor 35 can be reprogrammed based on the information from the data processing results acquisition unit 33 and the user information management unit 37. In addition, the information from the data processing results acquisition unit 33 and the user information management unit 37 can be sent to the cloud server 1 via the network connector 21.

Figure 5:
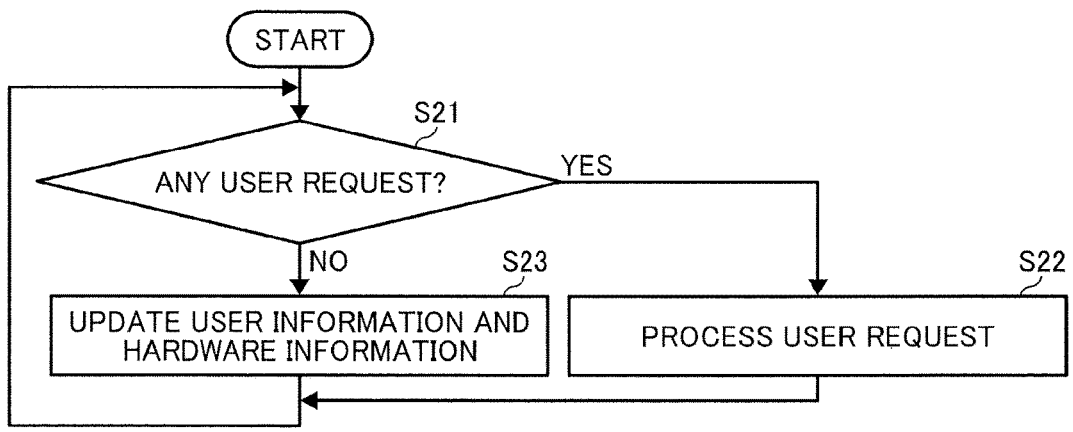
FIG. 5 is a flowchart illustrating a user request and information update process performed by a processing-content control unit of the data processing device illustrated in FIG. 4.

FIG. 5 is a flowchart illustrating a user request and information update process performed by the processing-content control unit 30 of the data processing device 20 of FIG. 4.

Referring to FIG. 5, S21 determines whether the user request input unit 36 receives a request from the user. The request from the user may be, for example, a request for performing a specific function with the data processing device 20. If YES at S21, the process proceeds to S22; if No, the process continues to S23. In S22, the reconfigurable hardware processor 32 processes the user request and then the process returns to S21. In S23, the user information in the user information management unit 37 is updated in the background. If necessary, the hardware information stored in the hardware information storage 34 is updated via the hardware information control unit 35 and glen the process returns to S21.

As described above, according to the user request and information update process of FIG. 5, the user request is performed when there is the user request being received, while the user information and the hardware information are being updated. Through this process, the hardware information can be automatically updated by cooperating with the cloud server 1 without any instructions from the user.

Figure 6:
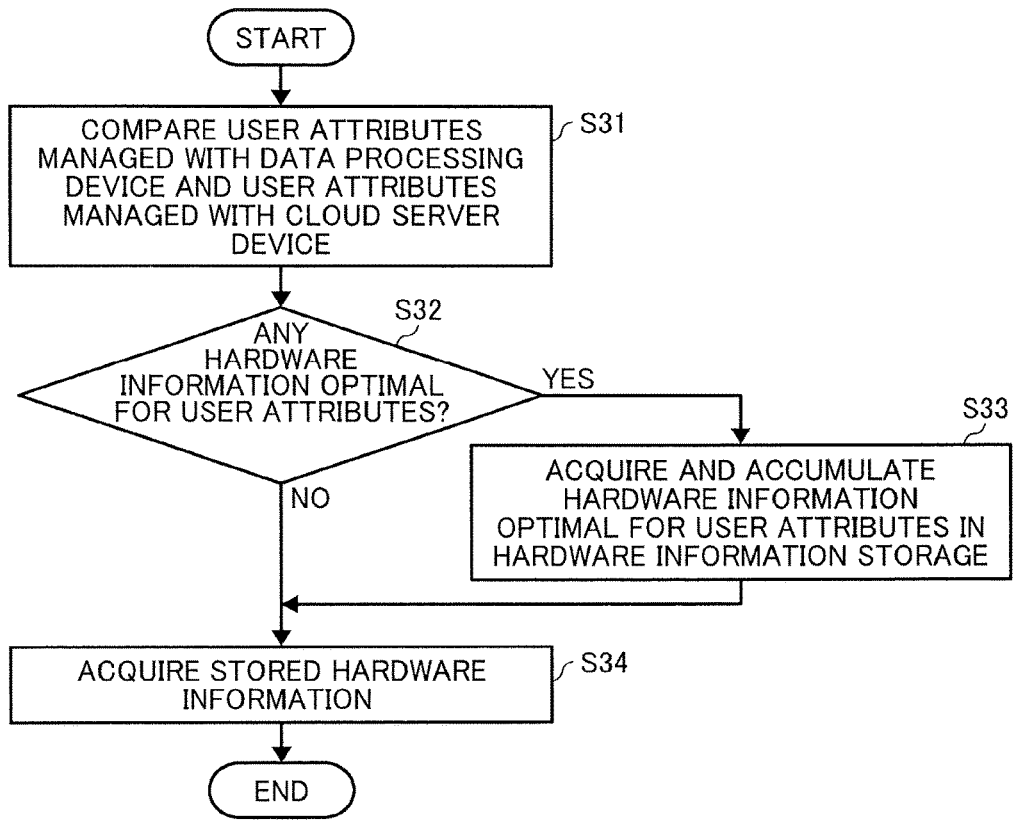
FIG. 6 is a flowchart illustrating an acquisition process for acquiring hardware information performed by a hardware information control unit of the data processing device illustrated in FIG. 4.

FIG. 6 is a flowchart illustrating the acquisition process for acquiring the hardware information performed by the hardware information control unit 35 of the data processing device 20 of FIG. 4. The acquisition process described in FIG. 6 is performed to obtain the hardware information from the cloud server 1 and reprogram contents of processing in the reconfigurable hardware processor 32 according to the usage trend of the user.

In S31 of FIG. 6, the data processing device 20 compares between the user information managed with the data processing device 20 (FIG. 8) and the user information managed with the cloud server 1 and obtained from the cloud server 1 (See S5 of FIG. 2 and S14 of FIG. 3). Next, S32 determines whether the hardware information database memory 13 stores the hardware information optimal for the user information of the login user, for example, by sending a request to the cloud server 1. Specifically, S32 determines whether there is hardware information subject to changing the degree of parallelism of circuits to the optimal degree according to the "process that is frequently used" by the user. If YES in S32, the process proceeds to S33; if NO, the process continues to S34. In S33, the hardware information optimal for the user information of the log in user is acquired and accumulated to the hardware information storage 34 and the process proceeds to S34. In S34, the hardware information stored in the hardware storage 34 is programmed to the reconfigurable hardware processor 32 and the process is completed. When determining that the hardware information database memory 13 does not store the hardware information optimal for the user information of the login user at S32, the hardware information control unit 35 programs with hardware information that is stored in the hardware information storage 34 and can achieve an average performance to the reconfigurable hardware processor 32. S32 may determine whether the hardware information storage 34 stores hardware information, which is optimal for the user information of the login user, in addition or in alternative to searching the hardware information database memory 13, when sufficient hardware information is locally stored.

As described above, the hardware information optimal for the user information can be obtained by comparing the user information managed with the data processing device 20 and the user information managed with the cloud server 1 with the acquisition process of FIG. 6.

Figure 7:
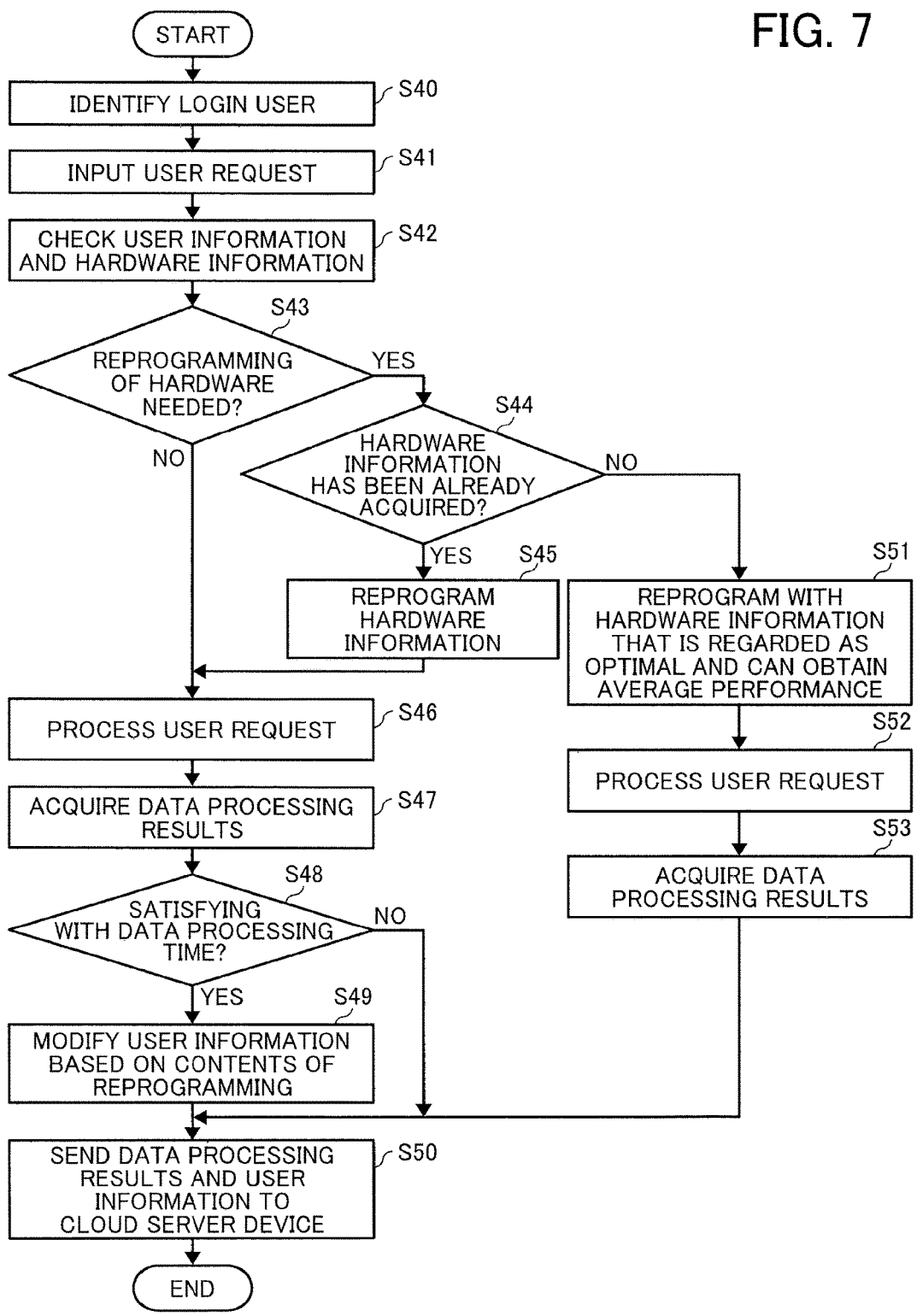
FIG. 7 is a flowchart illustrating a reprogramming process for reprogramming the hardware information performed by the hardware information control unit of the data processing device illustrated in FIG. 4.

FIG. 7 is a flowchart illustrating the reprogramming process for reprogramming the hardware information performed by the data processing device 20, in particular, the hardware information control unit 35 of FIG. 4.

In S40 of FIG. 7, the personal identification unit 38 identifies the user and allows the user to log in to the data processing device 20. In S41, a user request related to predetermined image processing, which is received from the user request input unit 36, is input. Next, in S42, the user information reflecting the current usage trend, as well as the user attributes of the users, as indicated by the user information illustrated in FIG. 8 and current hardware information programmed to the reconfigurable hardware processor 32 are checked and analyzed. S43 then determines whether reprogramming of the hardware is needed based on analysis of S42, if YES, the process continues to S44; if NO, the process continues to S46. At this time, whether the current hardware information programmed to the reconfigurable hardware processor 32 is optimal for the current login user is determined. Specifically, when the hardware information associated with the user information of the login user matches with the current hardware information programmed to the reconfigurable hardware processor 32, it is not necessary to reprogram the hardware. On the other hand, when the hardware information associated with the user information of the login user is different from the current hardware information programmed to the reconfigurable hardware processor 32, it is necessary to reprogram the hardware. S44 determines whether the hardware information optimal for the login user has been already acquired from the cloud server 1; if YES, the process continues to S45 if NO, the process continues to S51. In S45, the hardware information control unit 35 performs reprogramming of the hardware information optimal for the user. Specifically, the degree of parallelism of circuits is adjusted based on, for example, the usage trend as indicated by the user information illustrated in FIG. 8. In S46, the user request is processed with the reconfigurable hardware processor 32. In S47, the data processing results acquisition unit 33 obtains data processing results, such as a data processing time, etc., for processing using the reprogrammed FPGA. S48 determines whether the data processing time meets a predetermined expected time (whether the data processing time is equal to or less than a predetermined threshold); if YES, the process continues to S49, if NO the process continues to S50. In S49, the user information is modified to reflect processing contents (circuits) of the FPGA that have been reprogrammed, and then the process continues to S50.

In S51 of FIG. 7, the hardware information control unit 35 performs reprogramming with the hardware information that may be input by a designer and can achieve an average performance. For example, in case there is no optimized hardware information that can be obtained from the cloud server 1, the designer may design hardware information indicating a reprogrammed circuit for performing the frequently-used process to achieve average performance.

Subsequently, in S52, the user request is processed with the reconfigurable hardware processor 32. In S53, the data processing results acquisition unit 33 obtains data processing results, which are generated by performing processing with the reprogrammed FPGA, and then the process continues to S50. In S50, the acquired data processing results are associated with the user information and the hardware information, and each type of the information is sent to the cloud server 1 in association one another, and the reprogramming process is completed.

With S50, the cloud server 1 can accumulate the data processing results that are associated with the hardware information and the user information in the databases, such that the hardware information can be optimized based on the data processing results for later processing.

The reprogramming process of FIG. 7 enables the reconfigurable hardware processor 32 to be reprogrammed to reflect the optimal circuit information obtained for the user, if necessary, when the user request is input, based on analysis between the hardware information currently programmed and the user information of the user. When the hardware information cannot be obtained, for example, when the cloud server 1 accumulates none of user information and hardware information, the data processing device 20 may be input with the circuit information of the hardware that is determined by the designer as optimal to achieve the average performance. On the other hand, when the cloud server 1 accumulates the user information and hardware information, such that the hardware information can be provided to the data processing device 20, the data processing device 20 analyzes the hardware information based on the user information and, if necessary, the reconfigurable hardware processor 32 can be reprogrammed with the circuit information optimal for the user.

FIG. 8 is a table illustrating one example of user information stored in the data processing device 20 in FIG. 1. Here, the user information management database memory 12 also stores the information as the user information management database 12a that is similar to the user information stored in the data processing device 20, as illustrated in FIG. 8. In FIG. 8, the user information includes, user attributes for each user including user ID, gender, age, length of service, position, and department. In addition, the user information, in FIG. 8, also includes process that is frequently used (more than a predetermined number of times) by user and hardware information ID number that links the hardware information with. Here, the process that is frequently used is defined as a process of the processes performed with the reconfigurable hardware processor 32 and having a ratio of the number of times of use that exceeds, for example, 30 percent to the total number of all the processes that the user previously performed. As described with the table, for each user who has operated the data processing device 20, various user attributes are accumulated in association with the process that is frequently used. The frequently-used process may be one or more processes. In order to optimize the hardware information in view of the process that is frequently used for a specific user using the data processing device 20, in one example, user information such as the user attributes for the other users using the data processing device 20 is referred to.

As one example of decision criteria for selecting the hardware information for a specific user, information regarding the department to which that user belongs can be used. Suppose that user A and user B belonging to a design department process a function with the data processing device 20, and then the hardware information optimized for process A and process B is generated and stored in the cloud server 1 or the data processing device 20. When user F belonging to the same design department uses the data processing device 20 at the first time, user F can use the hardware information optimized for process A and process B based on information obtained when user A and user B use the data processing device 20. That is, the data processing device 20 refers to the user attributes of user E, to find for the frequently-used process of the other user A and B who have similar user attributes.

Additionally, the decision criteria can be set to a combination of a plurality of user attributes, for example by adding a user attribute such that a user with a length of service of less than five years tends to use process B. This can provide, the hardware information optimized for more specific user attributes.

FIG. 9 is a table illustrating an example of the hardware information in the data processing device 20 in FIG. 1. The hardware information management database memory 13 also stores in the hardware information database 13a the information that is similar to the hardware information stored in the data processing device 20 as illustrated in FIG. 9. The hardware information in FIG. 9 stores hardware information ID numbers and configuration data corresponding to each hardware information ID number. Here, configuration data 1 is circuit configuration information optimized for a user who frequently uses process A. Configuration data 2 is circuit configuration information optimized for a user who frequently uses processes A and B. In addition, configuration data 3 is circuit configuration information optimized for a user who frequently uses process C. Configuration data 4 is circuit configuration information optimized for a user frequently uses processes A and C. Configuration data 5 is circuit configuration information optimized for a user who frequently uses process B. Configuration data 6 is circuit configuration information that is regarded as optimal by the designer and can achieve an average performance. The hardware information management database memory 13 stores all types of the circuit configuration information that have been generated, while the data processing device 20 may only store a part of the circuit configuration information of the circuit configuration data described in FIG. 9 when the hardware information storage 34 has a small amount of storage. Although when the amount of storage is small, the hardware information storage 34 always holds configuration data 6, which can achieve an average performance.

FIGS. 10A, 10B, and 10C are diagrams illustrating examples of processing times for explaining one example of the decision criteria for determining whether the hardware information is optimal in the data processing device 20 in FIG. 1. FIG. 10A is a diagram illustrating one example of a processing time before optimization. FIG. 10B is a diagram illustrating one example of a processing time after first optimization. FIG. 10C is a diagram illustrating one example of a processing time after second optimization.

The processing time can be one of the criteria for determining whether the hardware information is optimal. When it is assumed that a user often uses process A, the hardware information with the increased degree of parallelism for process A is generated and provided for the user for use. When the user uses the generated hardware information, the processing time is obtained as data processing results to be compared with the processing time before the optimization of FIG. 10A. Which is previously measured, to determine that the optimization is effective. After that, this optimized hardware information is provided for users who are assumed to often use process A to reduce the processing time of process A.

Assuming that the user uses only the process A further than alter the first optimization of FIG. 10B, increasing the degree of parallelism for process A further can be considered. Increasing the degree of parallelism too much, however, may not always increase performance. The processing time changes little after the second optimization as illustrated in FIG. 10C compared with the processing time after the first optimization. For this case, after the second optimization, which the degree of the parallelism further increased, a circuit area further increased and the degree of parallelism of the other processes is decreased. Increasing the degree of parallelism for process A to 20, accordingly, is determined to be not effective. As described above, setting the processing time to the criterion for determining optimality can provide the hardware information that has optimal processing performance for the user.

In the example of FIGS. 10A, 10B, and 10C, the processing time is the criterion, however the criteria can be changed, and provide the hardware information optimized for a various uses, accordingly. Taking the example of optical character recognition (OCR) into account, reading accuracy (matching accuracy) can be set to the criterion to optimize dictionary data for the OCR. When the OCR is perforated with high speed using an accelerator with reconfigurable hardware, the dictionary data referred by the reconfigurable hardware for performing the OCR may be optimized. When the reconfigurable hardware limits an amount of information of the dictionary data available at a time to perform the OCR with high speed using an accelerator with the reconfigurable hardware, it is considered that the recognition rate of the OCR is not so high. For this situation, the data processing results acquisition unit 33 sends the processed image data and results of the OCR to the cloud server 1. The cloud server 1 then performs the OCR processing accurately using a large amount of dictionary data and judges the reading accuracy of the OCR results of the data processing device 20. Subsequently, the cloud server 1 generates optimized hardware information that has been replaced with optimized dictionary data according to accuracy of recognition, and provides the optimized hardware information. As described above, using the reading accuracy as the decision criterion, the OCR can be performed with the dictionary data that has been optimized for specific user attributes. For this situation, gender can be considered as one of the user attributes to be set to the decision criterion.

FIG. 11 is a table illustrating an example of data processing results of the data processing device 20 in FIG. 1. The data processing results management database memory 14 also stores the information as the data processing result management database 14a that is similar to the data processing results as illustrated FIG. 11. In FIG. 11, the degree of parallelism of each process and a processing time used for each process are stored for each hardware information ID number.

Figure 12C:
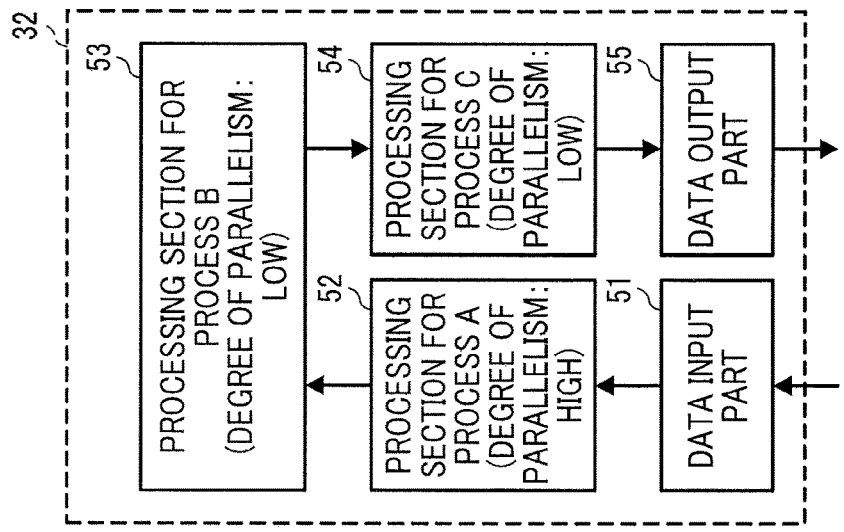
FIG. 12C is a block, diagram illustrating a third example configuration of the reconfigurable hardware processor generated by the hardware information generating unit illustrated in FIG. 1.
Figure 12B:
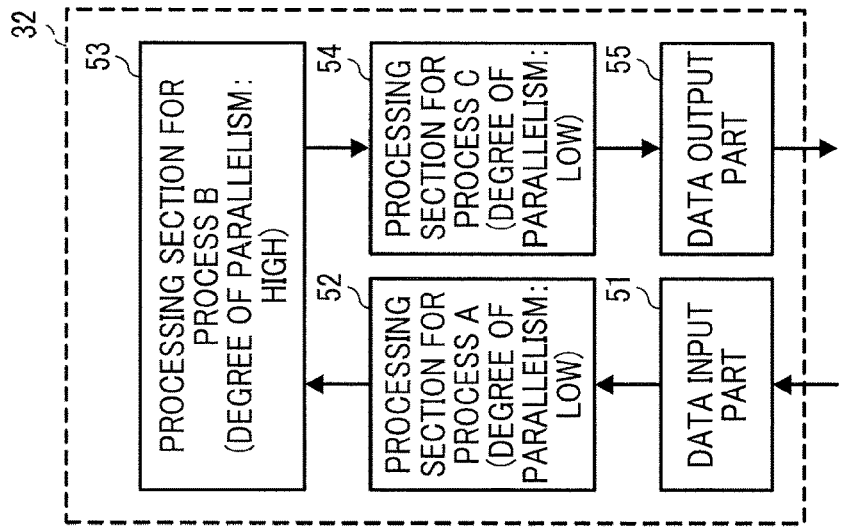
FIG. 12B is a block diagram illustrating a second example configuration of the reconfigurable hardware processor generated by the hardware information generating unit illustrated in FIG. 1.
Figure 12A:
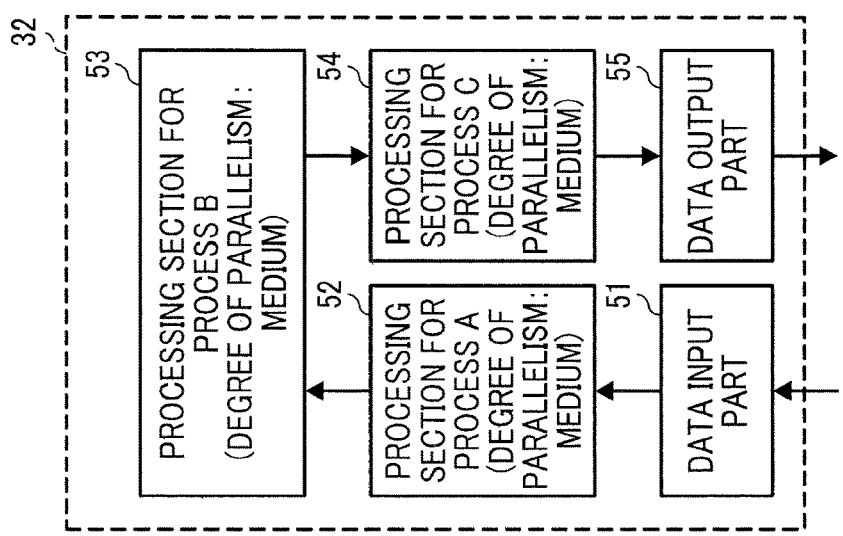
FIG. 12A is a block diagram illustrating a first example configuration of a reconfigurable hardware processor generated by a hardware information generating unit illustrated in FIG. 1.

FIG. 12A is a block diagram illustrating a first example configuration of the reconfigurable hardware processor 32. The first example configuration is generated by the hardware information generating unit 15 in FIG. 1. FIG. 12B is a block diagram illustrating a second example configuration of the reconfigurable hardware processor 32. The second example configuration is generated by the hardware information generating unit 15 in FIG. 1. FIG. 12C is a block diagram illustrating a third example configuration of the reconfigurable hardware processor 32. The third configuration is generated by the hardware information generating unit 15 in FIG. 1.

In FIGS. 12A to 12C, the reconfigurable hardware processor 32 includes a data input part 51, processing sections 52, 53, and 54 that perform process A, process B, and process C, respectively and sequentially, and a data output part 55. Referring to FIG. 12A, the degree of parallelism of all of the processing sections 52, 53, and 54 is set to "medium". Referring to FIG. 12B, the respective degree of parallelism of the processing sections 52, 53, and 54 is set to "low", "medium" and "high", respectively. Referring to FIG. 12C, the respective degree of parallelism of the processing sections 52, 53, and 54 is set to "high", "medium" and "low", respectively. Here, the degree of parallelism of each of the processing sections 52, 53, and 54 indicates the number of circuits assigned to each processing section of the all circuits configuring the reconfigurable hardware processor 32. That is, when a processing section has "high" degree of parallelism, the ratio of the number of circuits to all the circuits configuring the reconfigurable hardware processor 32 is large, and when a processing section has "low" degree of parallelism, the ratio of the number of circuits is small. Additionally, when a processing section has "medium" degree of parallelism, the number of circuits assigned to the processing section to all of the circuits configuring the reconfigurable hardware processor 32 is smaller than the number of circuits for the "high" degree of parallelism, and larger than the number of circuits for the "low" degree of parallelism.

Here, the first example configuration of the reconfigurable hardware processor 32 illustrated in FIG. 12A is one example of a configuration that is programmed with the hardware information being regarded as optimal by the designer and able to obtain an average performance. With the first example configuration, the degree of parallelism for each of process A, process B, and process C can be set to the same value each other, and, for example, set the degree of parallelism to degree 4. In addition, the second example configuration of the reconfigurable hardware processor 32 illustrated in FIG. 12B is another example of a configuration that is programmed with configuration data 5. With the second example configuration, the degree of parallelism for process B that is frequently used is set to be higher than a predetermined value, for example, degree 8. Additionally, the degree of parallelism for process A and process C can be set to degree 2. The third example configuration of the reconfigurable hardware processor 32 illustrated in FIG. 12C is still another example of a configuration that is programmed with configuration data 1. With the third example configuration, the degree of parallelism for process A that is frequently used is set to be higher than the predetermined value, for example degree 8. The degree of parallelism for processes A and C can be set to, for example, degree 2. Here, the predetermined value is a value that is regarded as optimal by the designer and can achieve an average performance, for example degree 4.

What each of process A, process B, and process C includes varies depending on a function performed with the data processing device 20. When the data processing device 20 performs an OCR function, for example, process A may be color converting that converts RGB data to YMCK data, process B may be character area segmenting that segments characters from an image, and process C may be feature extraction that extracts a feature of the characters, such as degree of slope of the characters or the number of points of intersection. The data processing device 20 also may perform a plurality functions. When the data processing device 20 performs a function to embed invisible information, for example, the data processing 20 performs process A, process D and process E. Process D may be a reducing process to reduce an image, process F may be an invisible information embedding process that embeds invisible information including ID of the user performing printing and an ID number of the data processing device 20. Different functions performed with the data processing device 20 cause different processes, but the different functions may include a common process, such as, for this case, the color converting process. User information of a user who frequently performs the OCR function and the invisible information embedding function, thus, includes process A that is common to the OCR function and the the invisible information embedding function, as a process that is frequently used.

The reconfigurable hardware processor 32 can increase processing speed by increasing the degree of parallelism for a process. The reconfigurable hardware processor 32, however, also increases area consumption for circuits as the degree of parallelism increases for each process so that the degree of parallelism for all the processes cannot be set to be high. Providing some types of circuit information to change the degree of parallelism flexibly to generate a hardware configuration optimal for the user based on the usage trend of the user can provide the data processing device 20 that have the optimized FPGA or the hardware accelerator.

The reconfigurable hardware processor 32 may employ, for example, an Open CL (registered trademark) for the FPGA as the hardware information generating unit 15, which generates the circuit information that can flexibly change the degree of parallelism of processing sections 52 to 54.

According to the embodiment described above, operation of optimizing the hardware accelerator to achieve the optimal processing speed for the process that is frequently used by the user do not need to start from zero for each system nor for each user. The processing time related to the one or more processes that a user frequently uses becomes optimal fast by utilizing the history information of the other users. That is, the data processing system 100 can shorten the processing time for the optimization process, thus increasing the processing speed.

The hardware information generating unit 15 can generate the hardware information that is not registered in the database 13a, and accordingly can optimize the hardware information for the usage trends that is not estimated to be provided.

In addition, the newly-generated hardware information is disclosed to some of users to verify that the information can yield the satisfying results meeting a predetermined condition such that, for example, an actual processing time is equal to or less than a predetermined time. After the verification, the newly-generated hardware information is disclosed to all users. That is, the hardware information controller 35 can limit the hardware information to be disclosed to all users to the hardware information having favorable results from the hardware information that is automatically generated.

In addition to that, when there is no request for the data processing device 20 from the user, the user information managed in the data processing device 20 and the cloud server 1 and the data processing results are checked to obtain the hardware information optimal for the user information in advance. Through this the data processing device 20 can achieve the hardware information optimal for the user information before the user request for is input.

The data processing results acquisition unit 33 included in the data processing device 20 acquires the data processing results of the processes performed by the data processing device 20. The hardware information control unit 35 associates the data processing results with the user information and the hardware information and sends these pieces of information to the cloud server 1 via the network connector. The cloud server 1, accordingly, can accumulate the data processing results associated with the hardware information, such that the hardware information can be optimized based on the data processing results.

Further, the hardware information generating unit 15 generates the hardware information by adjusting the degree of parallelism of the circuits in the reconfigurable hardware processor 32 according to the usage trend for the processes for each user of the data processing device 20. The hardware information generating unit 15, here, preferably adjusts the degree of parallelism of the circuits of the reconfigurable hardware processor 32 in a manner that the degree of parallelism for the process that is frequently used is higher than a predetermine value for each user of the data processing device 20. The hardware information generating unit 15 also may adjust the degree of parallelism of the circuits of the reconfigurable hardware processor 32 in a manner that the degree of parallelism for processes that is less frequently used is less than the predetermine value for each user of the data processing device 20.

The hardware information generating, unit 15 also uses an Open CL (registered trademark) for the FPGA to generate the optimized hardware information by adjusting the degree of parallelism for the processes. The Open CL (registered trademark) for the FPGA can perform the optimization process easily.

In the embodiments described above, the cloud server 1 is employed, however the embodiments of the present invention are not limiting to such a cloud server and can employ a server connected to the plurality of data processing device 20 via a network without configuring cloud.

Although the exemplary embodiments of the invention have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A data processing system comprising:
   a data processing device to perform various types of image processing using a reconfigurable hardware processor; and
   a server connected to the data processing device via a network, the server including:
   a memory to store user information of one or more users who have operated the data processing device to perform various types of image processing from among the various types of image processing, the user information indicating usage trends for processing performed by each user with the data processing device, the usage trends indicating a number of times that each of the various types of image processing are performed at the data processing device;

a receiver to receive a request for hardware information from the data processing device, the request including user information obtained at the data processing device; and a processor to compare between the user information stored in the memory and the user information included in the request for hardware information, and optimize hardware information used for previously configuring the reconfigurable hardware processor to generate optimized hardware information based on a comparison result, and wherein the data processing device includes:

a processor to obtain the optimized hardware information from the server and reconfigure the reconfigurable hardware processor based on the optimized hardware information, wherein the various types of image processing includes at least optical character reader (OCR) processing and an invisible information embedding processing in which invisible information is printed on a media.

2. The data processing system of claim 1, wherein the user information of the request for hardware information indicates a usage trend in processing performed by a user at the data processing device, and the processor of the server adjusts degree of parallelism of circuits of the reconfigurable hardware processor according to the usage trend in processing at the data processing device, and generates the optimized hardware information to reflect the adjusted degree of parallelism of circuits.

3. The data processing system of claim 2, wherein the processor of the server adjusts the degree of parallelism of circuits of the reconfigurable hardware processor in a manner that degree of parallelism of circuits for a process that is frequently used is higher than a predetermined value, the frequently-used process being one or more processes that are frequently used by each user operating the data processing device.

4. The data processing system of claim 3, wherein the processor of the server adjusts the degree of parallelism of circuits of the reconfigurable hardware processor in a manner that degree of parallelism of circuits for a process that is less frequently used is lower than a predetermined value, the process that is less frequently used being one or more processes that are less frequently used by each user operating the data processing device.

5. The data processing system of claim 1, wherein the reconfigurable hardware processor is a field programmable gate array (FPGA), and wherein the processor of the server adjusts the degree of parallelism of circuits in the reconfigurable hardware processor using a predetermined programming language for the FPGA.

6. The data processing system of claim 2, wherein the processor of the server further determines whether the reconfigurable hardware processor that is reconfigured based on the optimized hardware information satisfies a predetermined condition using the data processing device, and registers the optimized hardware information in the memory based on a determination that the reconfigurable hardware processor satisfies the predetermined condition.

7. The data processing system of claim 6, wherein the predetermined condition is that actual processing time for processing using the reconfigurable hardware processor that is reconfigured is equal to or less than a predetermined time.

8. The data processing system of claim 1, wherein the data processing device obtains the hardware information optimized for the user information in the data processing device from the server when no request is input.

9. The data processing system of claim 1, wherein the processor of the data processing device obtains data processing results of processing performed with the data processing device having the reconfigured hardware processor, associates the obtained data processing results with the user information and the optimized hardware information of the data processing device, and sends the data processing results associated with the user information and the optimized hardware information to the server.

10. A data processing control apparatus connected to a data processing device that performs various types of image processing using a reconfigurable hardware processor, the apparatus comprising:

a memory to store user information of one or more users who have operated the data processing device to perform various types of image processing from among the various types of image processing, the user information indicating usage trends for processing performed by each user with the data processing device, the usage trends indicating a number of times that each of the various types of image processing are performed at the data processing device;

a receiver to receive a request for hardware information from the data processing device, the request including user information obtained at the data processing device;

a processor to compare between the user information stored in the memory and the user information included in the request for hardware information, and optimize hardware information used for previously configuring the reconfigurable hardware processor to generate optimized hardware information based on a comparison result; and a transmitter to transmit the optimized hardware information to the data processing device to control the data processing device to reconfigure the reconfigurable hardware processor based on the optimized hardware information, wherein the various types of image processing includes at least optical character reader (OCR) processing and an invisible information embedding processing in which invisible information is printed on a media.

11. A data processing control method performed by a data processing control apparatus connected to a data processing device, the data processing device configured to perform various types of image processing using a reconfigurable hardware processor, the method comprising storing, in a memory, user information of one or more users who have operated the data processing device to perform various types of processing from among the various types of image processing, the user information indicating usage trends for processing performed by each user with the data processing device, the usage trends indicating a number of times that each of the various types of image processing are performed at the data processing device;

receiving a request for hardware information from the data processing device, the request including user information obtained at the data processing device;

comparing between the user information stored in the memory and the user information included in the request for hardware information to generate a comparison result; and optimizing hardware information used for previously configuring the reconfigurable hardware processor to generate optimized hardware information based on the comparison result; and transmitting the optimized hardware information to the data processing device to control the data processing device to reconfigure the reconfigurable hardware processor based on the optimized hardware information;

wherein the various types of image processing includes at least optical character reader (OCR) processing and an invisible information embedding processing in which invisible information is printed on a media.

12. The data processing system of claim 1, wherein the data processing device is a multifunctional peripheral that performs at least a printing function.

* * * * *